July 3, 1928. C. F. HALL ET AL Re. 17,019

REFRIGERATING SYSTEM

Original Filed Oct. 13, 1927 2 Sheets-Sheet 1

INVENTORS
CARTER F. HALL
FREDERICK W. LEE
BY
ATTORNEY.

July 3, 1928. C. F. HALL ET AL Re. 17,019

REFRIGERATING SYSTEM

Original Filed Oct. 13, 1927 2 Sheets-Sheet 2

Inventor:
Carter F. Hall
Frederick W. Lee

Reissued July 3, 1928. Re. 17,019

UNITED STATES PATENT OFFICE.

CARTER F. HALL AND FREDERICK W. LEE, OF BALTIMORE, MARYLAND; SAID LEE ASSIGNOR TO SAID HALL.

REFRIGERATING SYSTEM.

Original No. 1,669,465, dated May 15, 1928, Serial No. 225,871, filed October 13, 1927. Application for reissue filed May 26, 1928. Serial No. 280,664.

This invention relates to refrigerating apparatus and more particularly to a refrigerating system which is especially adapted for use in connection with railway cars and the like.

Heretofore it has been the usual practice in cooling the drinking water on railway cars to pack a quantity of ice around the water pipe leading from a main water tank or reservoir. For this purpose the portion of the water pipe adjacent to the faucet is ordinarily surrounded by a tank or other receptacle within which the ice is received. Obviously this arrangement is subject to a number of serious objections, most important of which is that such an arrangement does not insure a constant supply of cold water due to the fact that it is often impossible to replenish the supply of ice which is necessary to maintain an even low temperature. Further, the problem of "icing" the tank is a serious one in that a sufficient quantity of ice must be kept on hand at various depots to meet the demands of the great number of railway drinking water systems, thereby introducing a handling expense for the ice which is quite considerable. Still further, inasmuch as each car of the train is usually supplied with one or more drinking founts, these latter often reaching a great number for each train and being located at considerable distances from each other, it becomes necessary to individually supply each fount with its own supply of ice, the expenditure of time and labor so involved being quite expensive.

It is among the objects of this invention to obviate the aforementioned objections and difficulties by providing an artificial refrigeration system to supplant the present methods now in general use upon railway vehicles, this artificial refrigeration system being not only highly efficient in use but being also entirely automatic in operation thereby requiring a minimum of attention.

A further object of the invention is the utilization of an electric refrigerating unit for insuring a constant supply of cold drinking water.

A still further object of the invention is the provision of a system of electric refrigeration wherein a compression type of refrigerating unit is used to supply a suitable liquid refrigerant to an evaporator surrounding that portion of the supply pipe from which the drinking water is drawn off.

A still further object of the invention is the provision of an electrical circuit including a generator operable to constantly maintain a storage battery charged to full capacity, the arrangement being such as to supply current to the refrigerating unit directly from the generator when the train is in motion or from the battery when the train is at rest and refrigeration is desired.

A still further object of the invention is the provision of an arrangement for insuring the positive circulation of air about the condenser coils of the refrigerating unit whereby to more readily effect liquefaction of the refrigerant.

Other objects of the invention will appear more fully hereinafter.

The invention consists substantially in the construction, combination, location and relative arrangement of parts, all as will be described more fully hereinafter as pointed out in the accompanying drawings, and finally pointed out in the appended claims.

Figure 1:
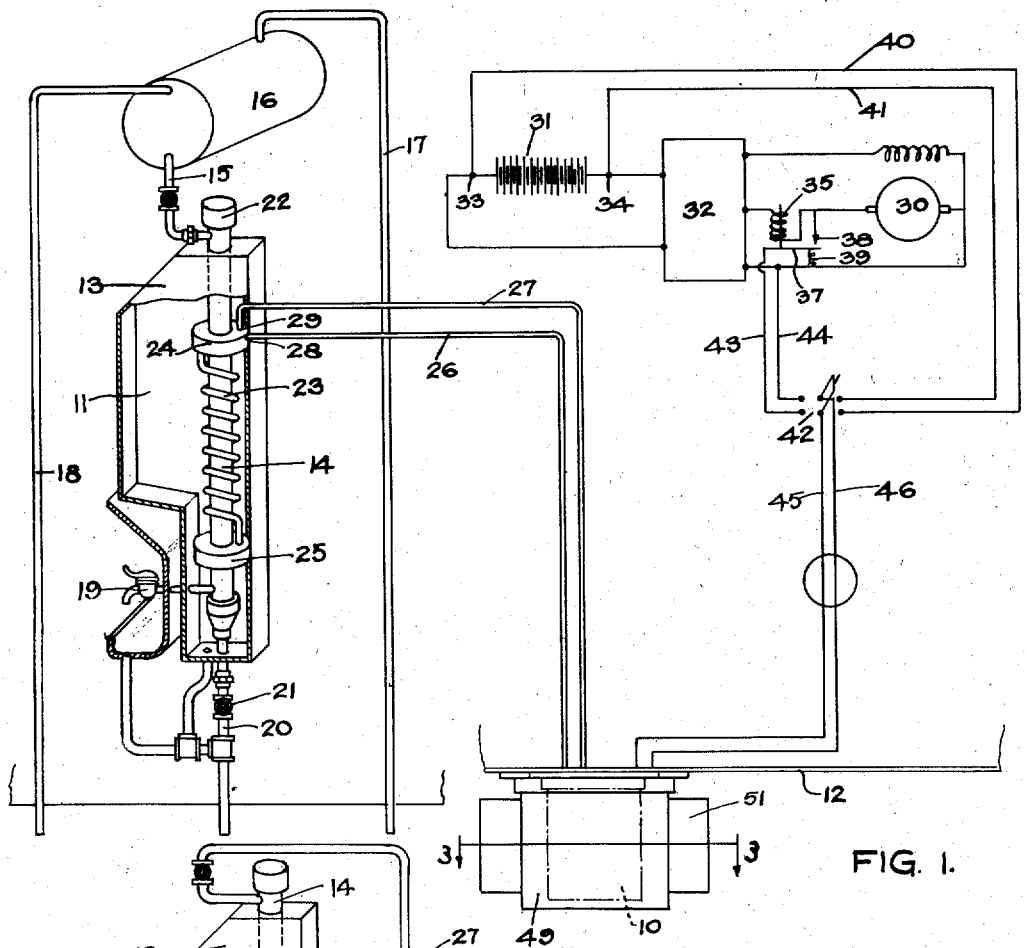
Figure 1 is a partly perspective and partly diagrammatic view showing the general arrangement and construction of the several component parts of the invention.

Referring more particularly to the drawings, Figure 1 shows the general arrangement of a refrigeration system embodying the principles of this invention, this system including a refrigerating unit designated generally by the reference numeral 10 operable to circulate a suitable refrigerant, such as sulphur dioxide, methyl chloride, ethyl chloride, carbon dioxide, or the like through the water cooler of a railway vehicle, this cooler being designated generally by the reference numeral 11. The refrigerating unit 10 is of the more or less usual compression type embodying a compressor, a condenser in the form of a coil of circular cross-section and an electric motor for operating the compressor. Inasmuch as the refrigerating unit per se does not form a part of this invention except in its relation to the system of refrigeration as a whole, further description of the refrigerating unit is deemed unnecessary and superfluous and will not be attempted in this specification.

The unit 10 is suitably mounted beneath the floor 12 of the railway vehicle in the manner most clearly shown in Figure 1. The drinking fount or cooler 11 which is located within the interior of the railway vehicle is of the usual construction now in more or less general use and comprises a tank or receptacle 13. A water pipe 14 passes through the tank 13, the upper end of which projects through the top of the tank 13 and is connected by pipe 15 to a main water supply tank 16. This main tank 16 is filled with water through the pipe 17, the overflow therefrom passing through the pipe 18. Water is drawn off from the pipe 14 through a faucet 19 connected to the lower end thereof. Preferably the pipe 14 is provided with a lower extension 20 within which is located a valve 21 for permitting the water to pass out through the bottom of the pipe 14 when it becomes desirable to clean the interior thereof. To facilitate this cleaning operation the upper end of the pipe 14 is provided with a removable cap 22 and the interior of the pipe 14 is preferably lined with porcelain or some other such vitreous coating.

Surrounding the portion of the pipe 14 which is disposed within the interior of the cooler tank 13 is a spiral coil 23 constituting the cooling element of the cooler. The upper and lower ends of this spiral coil terminate in vertically spaced manifolds 24 and 25. The lower manifold 25 is provided with no outlets while the upper manifold 24 is provided with both inlet and outlet openings which are in communication with the refrigerating unit 10 through the high and low pressure pipes 26 and 27 respectively. In the manner well understood in the art, the high pressure line 26 is connected to the inlet of the manifold 24 as at 28 while the low pressure line 27 is connected to the outlet of this manifold as at 29. It will be understood of course that the spiral coil 23 in the cooler unit constitutes the evaporator of the refrigerating system, refrigeration being produced in the cooling unit by the latent heat of vaporization of the particular refrigerant employed. The vapor resulting from the vaporization of the liquid refrigerant in the spiral coils 23 is conducted to the suction side of the compressor through the pipe 27. The compressor then forces the gas into the condensing element of the refrigerating unit where it is liquefied by cooling, in this case preferably by means of air. The liquid refrigerant is then returned to the cooling element through the pipe 26. This cycle is continuous so long as the compressor continues to be driven by the electric motor of the refrigerating unit 10.

If desired, and it is preferable in order to obtain a higher degree of refrigeration, the evaporator coil 23 of the cooling unit is immersed in a solution of calcium or salt brine contained in the tank 13. While in the particular construction disclosed in Figure 1 the evaporator unit comprises only a single spiral coil 23, it is to be understood that a series of such coils may be employed extending in multiple between the manifolds 24 and 25.

The circuit for supplying current to the compressor motor will now be described. Included in this circuit is a generator 30 and a storage battery 31, the former being connected to the axle of the vehicle in such a manner that when the vehicle is in motion current will be generated by the generator. The generator is connected in the usual manner through a charging control box 32 to the terminals 33 and 34 of the storage battery so that the latter is constantly supplied with a charging current from the generator. A solenoid 35 is connected in the line between the charging control box 32 and the terminal 36 of the generator. Obviously whenever the vehicle is on motion and the generator generating current this solenoid 35 will be energized with the result that the armature 37 will be pulled into contacting engagement with the fixed contact point 38. When the vehicle is at rest with the consequent result that no current is being generated by the generator 30 the solenoid 35 is deenergized and the armature 37 is immediately pulled away from the fixed contact point 38 by means of the spring 39.

The terminals 33 and 34 of the storage battery 31 are respectively connected through the wires 40 and 41 to one set of terminals of a double-pole double-throw switch 42, while the terminals of the generator 30 are in turn respectively connected through the wires 43 and 44 to the opposite set of terminals of said switch. Wires 45 and 46 connect the compressor motor to the intermediate set of terminals of the double-pole double-throw switch 42.

When the train is in motion it is preferable to operate the compressor pump by current supplied from the generator and in order to accomplish this it is merely necessary to throw the switch 42 over to the left so as to connect the wires 43 and 44 to the wires 45 and 46 respectively. Should it be desired however to operate the compressor motor from the storage battery 31, as for instance when the train is at rest, the switch 42 is thrown over to the right so as to connect the wires 41 and 40 to the wires 45 and 46 respectively.

Figure 2:
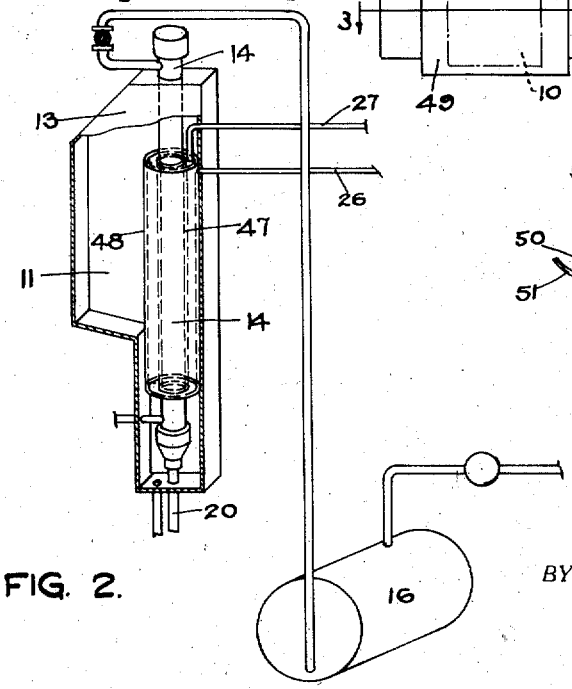
Figure 2 is a perspective view of a modified form of construction of evaporating unit, this figure also showing an alternative arrangement from that shown in Figure 1 for delivering water to the faucet.

In Figure 2 is shown a modified form of construction of evaporator unit. In this case instead of employing the spiral coil or coils 23 as shown in Figure 1, a pair of concentric shells 47 and 48 are employed, these shells surrounding the water pipe 14. The shells 47 and 48 are of different diameters, the upper and lower ends thereof being joined together to provide an elongated annular chamber through which the refrigerant may be circulated. As in the arrangement shown in Figure 1 the liquid refrigerant is delivered to this annular chamber through the high pressure line 26 while the vapor resulting from the vaporization of this liquid in the chamber is delivered back to the suction side of the compressor through the low pressure line 27. In all other respects the system operates in a manner described above in connection with the arrangement shown in Figure 1.

It is to be noted that while in Figure 1 the water is supplied to the pipe 14 from the main tank 16 through the action of gravity, in the arrangement shown in Figure 2 the water is supplied to the pipe 14 from the tank 16 under compression. It is to be understood, of course, that either the gravity or forced feed of water may be employed without affecting the refrigerating action which takes place within the cooler 11.

Figure 3:
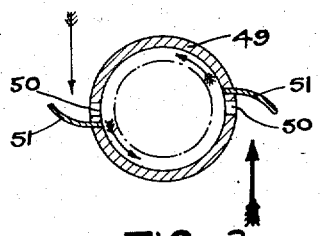
Figure 3 is a general view taken along the line 3—3 of Figure 1.

It has already been stated that the refrigerator unit includes a compressor which forces the gas into the condensing element where it is liquefied by cooling, in this instance by means of air. To facilitate this liquefaction of the gas it may be found desirable to enclose the refrigerating unit 10 within a casing or shell 49, this latter casing being provided at diametrically opposed sides thereof with vertically extending openings or slots 50, these openings lying to either side of the line of travel of the vehicle. Vertically extending baffles 51 are secured to the opposite sides of the casing 49, each in the immediate vicinity of one of the openings 50, these baffles being so disposed that when the vehicle is moving in one direction or another, one or the other of the baffles will cause air to be trapped and forced into its adjacent opening 50 for circulation about the interior of the casing and consequently about the surfaces of the condenser element disposed within said casing. If it is assumed that the vehicle is traveling in the direction of the heavy arrow, the circulation of air through the opening 50 and about the interior of the casing 49 will be as indicated by the lighter arrows in Figure 3.

Figure 4:
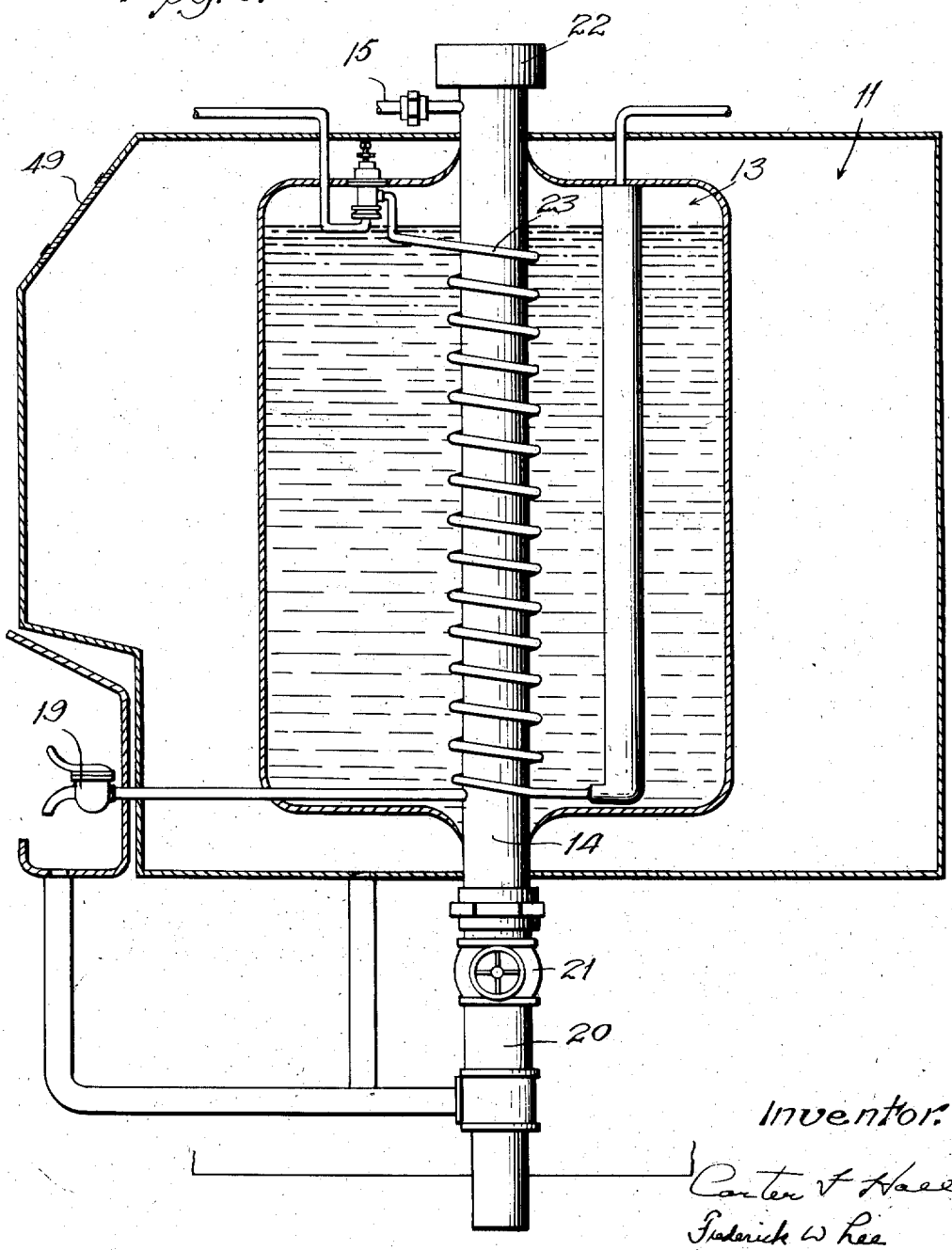
Fig. 4 shows one of the water coolers partly in section.

In Figure 4, 14 represents the water pipe, 23 is the evaporator coil, 13 is a tank for the brine or other holdover and 11 is a second container surrounding said brine tank, evaporator, and water pipe. This second container 11 is to receive ice or other refrigerant in an emergency. This container is to be filled through door 49.

It is to be understood, of course, that various changes in the construction and relative arrangement of the several parts herein disclosed and described may be from time to time made without departing from the real spirit or principles of this invention, and it is accordingly intended to claim the same broadly, as well as specifically, as indicated in the appended claims.

What is claimed as new and useful is:

1. In an artificial refrigerating system a liquid cooling apparatus comprising a container for liquid to be cooled, an evaporator for cooling said container, a brine tank surrounding said evaporator and container, a second container surrounding said brine tank, evaporator and first named container, an auxiliary tank for liquid connected to said first named container, a removable cover attached to said first named container and a valve attached to said first named container, means for circulating liquid from said tank to said first named container, and means for withdrawing water from said first named container.

2. A liquid cooling apparatus comprising a container for liquid to be cooled, an evaporator for cooling said container, a brine tank surrounding said evaporator and container, a second container surrounding said brine tank, evaporator and container, said second named container being adapted to receive ice or other refrigerants, and means for supplying and withdrawing a volatile refrigerant from said evaporator.

3. A liquid cooling apparatus comprising a container for liquid to be cooled, an evaporator for cooling said container, a brine tank surrounding said evaporator, a second container surrounding said brine tank, evaporator, and container, said second named container being adapted to receive ice, or other refrigerants, and means for supplying and withdrawing a volatile refrigerant from said evaporator.

4. In an artificial refrigerating system a liquid cooling apparatus comprising a container for liquid to be cooled, an evaporator for cooling said container, a brine tank holdover for said evaporator, and container, a second container surrounding said brine tank, evaporator, and first named container, means for supplying and withdrawing liquid from said first named container, and means for supplying and withdrawing a volatile refrigerant from said evaporator, said second named container being adapted to receive ice or other refrigerants.

In testimony whereof, we have hereunto affixed our signatures.

FREDERICK W. LEE.
CARTER F. HALL.